United States Patent [19]
Ishibashi

[11] Patent Number: 5,859,828
[45] Date of Patent: Jan. 12, 1999

[54] ELECTRONIC DEVICE USING RECORDING MEDIUM

[75] Inventor: Yasuhiro Ishibashi, Tokyo, Japan

[73] Assignee: Sony Corporation, Tokyo, Japan

[21] Appl. No.: 682,309

[22] Filed: Jul. 17, 1996

[30] Foreign Application Priority Data

Jul. 20, 1995 [JP] Japan .................................. 7-184452

[51] Int. Cl.⁶ .................................................. G11B 33/02
[52] U.S. Cl. .......................................................... 369/77.1
[58] Field of Search .................................. 369/77.1–77.2, 369/75.1–75.2, 291, 292; 360/133, 132, 94, 85

[56] References Cited

U.S. PATENT DOCUMENTS

| 4,673,994 | 6/1987 | Hida ............................................ 360/85 |
| 5,136,571 | 8/1992 | Nakajima ................................. 369/75.1 |
| 5,220,552 | 6/1993 | Yokoi et al. ............................ 369/77.1 |
| 5,517,478 | 5/1996 | Park ......................................... 369/77.1 |

FOREIGN PATENT DOCUMENTS

| 56-54661 | 5/1981 | Japan ..................................... 369/77.1 |
| 60-55547 | 3/1985 | Japan ..................................... 369/75.1 |
| 2087128 | 5/1982 | United Kingdom .................. 369/77.2 |

Primary Examiner—Allen T. Cao
Attorney, Agent, or Firm—Limbach & Limbach L.L.P.

[57] ABSTRACT

An electronic device using a recording medium such as an optical disk provided under a seat includes a device body, a guide surface portion and a lid. The device body includes an insertion mouth for inserting a recording medium. The guide surface portion is provided along a lower end edge of the insertion mouth defined at the front surface side of the device body. The lid is moved between a position for closing the insertion mouth of the device body and a position for opening the insertion mouth. The lid includes on its upper end side provided an auxiliary guide portion forming substantially the same plane as the guide surface portion when the lid is moved to the opening position.

26 Claims, 6 Drawing Sheets

FIG. 6

ELECTRONIC DEVICE USING RECORDING MEDIUM

BACKGROUND

1. Field of the Invention

The present invention relates to an electronic device using a recording medium, and more particularly to an electronic device using a recording medium having a guide for inserting a recording medium,

2. Background of the Invention

Heretofore, there is known an optical disk player using an optical disk called a compact disc (CD). An example of optical disk player will be described with reference to the drawings.

Figure 1A:
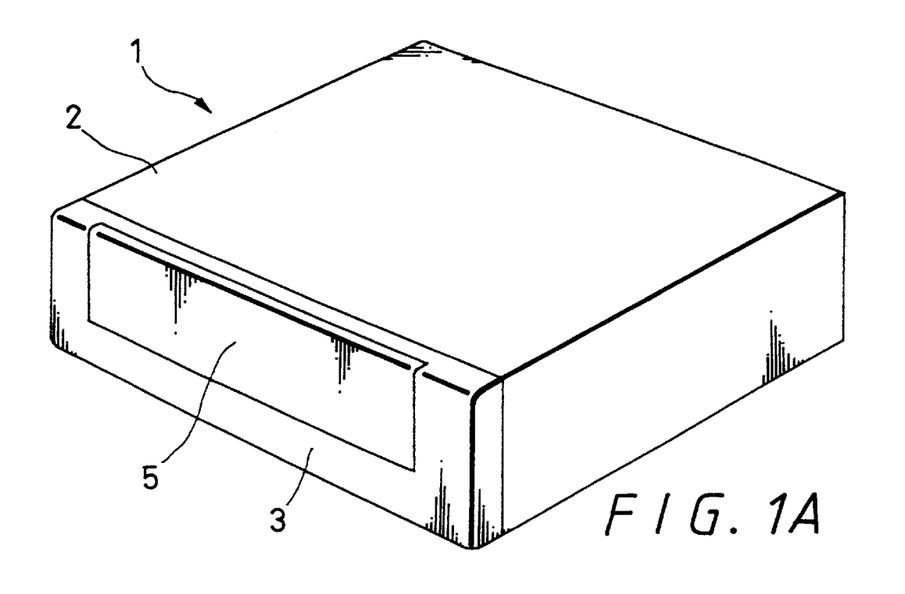
FIG. 1A is a perspective view illustrating the reproducing apparatus with a lid being opened and FIG. 1B is a perspective view illustrating the reproducing apparatus with the lid being closed.
Figure 1B:
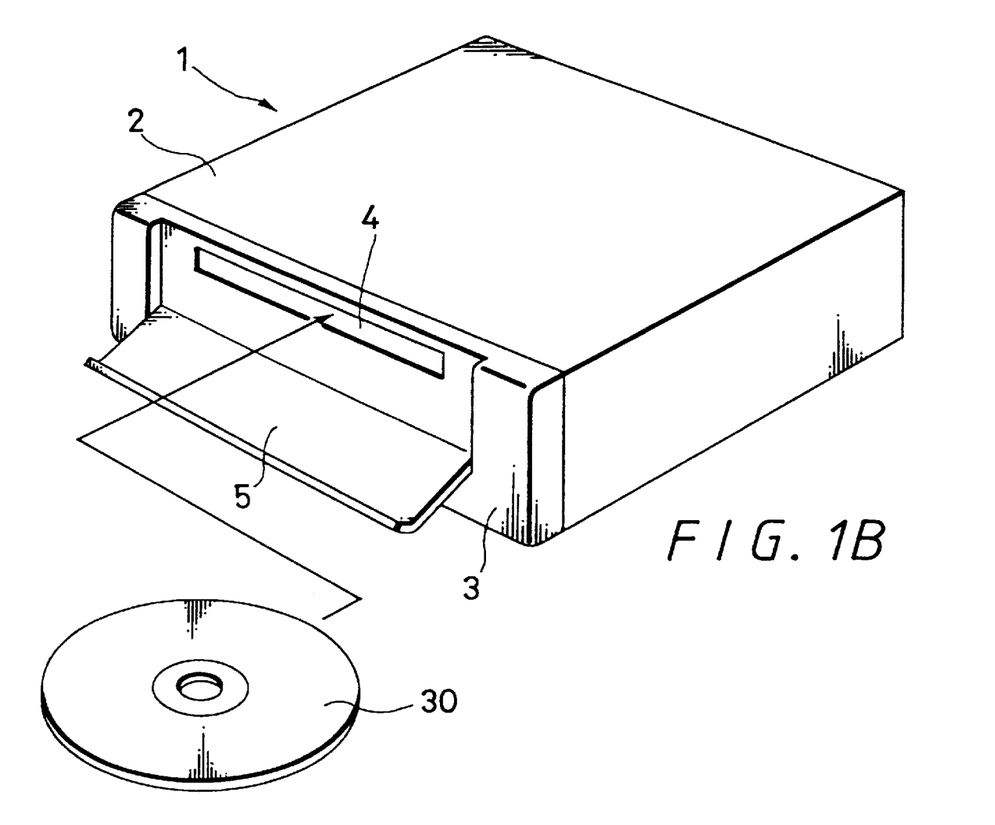

FIGS. 1A and 1B of the accompanying drawings show an optical disk player which is a reproducing apparatus 1 for reproducing information from an optical disk 30 such as a compact disk inserted thereto. An insertion mouth 4 is opened in the vertical surface of a front panel 3 attached to the front surface of the reproducing apparatus 1. The optical disk 30 is inserted into the insertion mouth 4 in substantially the horizontal direction.

A lid 5 for protecting the optical disk 30 from being smudged by dusts or the like is attached to the front panel 3 at its lower end portion serving as a hinge portion so as to become rotatable between the position for closing the insertion mouth 4 and the position for opening the insertion mouth 4. As shown in FIG. 1A, when the insertion mouth 4 is closed by the lid 5, it becomes possible to protect the inside of a device body 2 from being smudged by dusts or the like entered from the insertion mouth 4. As shown in FIG. 1B, when the optical disk 30 is inserted into the device body 2, the lid 5 is rotated in the front direction of the device body 2 to thereby open the insertion mouth 4.

While the lid 5 is rotatably attached to the device body 2 at the lower end portion serving as the hinge portion as described above, the lid 5 may arranged such that it is linearly slid in the lateral or longitudinal direction of the panel 3 of the device body 2 to thereby open and close the insertion mouth 4.

When the above reproducing apparatus 1 is installed, the reproducing apparatus 1 should preferably be installed at the place where the user can see the front of the reproducing apparatus so that the user can visually confirm the insertion mouth 4 in order to insert the optical disk 30. The reason for this is that, if the user inserts the optical disk 30 while not visually confirming the insertion mouth 4, then the optical disk 30 will be scratched or damaged. However, under various restrictions and conditions, the reproducing apparatus 1 is not always installed at the place where the user can visually confirm the front of the reproducing apparatus 1.

When the reproducing apparatus 1 is a reproducing apparatus for use with a so-called car navigation system, for example, a space for installing the reproducing apparatus 1 in the inside of car is limited so that the reproducing apparatus 1 is frequently installed under the seat.

In such case, the user looks down the reproducing apparatus 1 while seated in the seat so that the user cannot visually confirm the insertion mouth opened in the vertical surface of the front panel 3 substantially in actual practice.

Therefore, the user has to find out the insertion mouth 4 by groping or by intuition. Besides, there is then the possibility that the optical disk 30 will contact with the peripheral portion of the reproducing apparatus 1, thereby the optical disk 30 being scratched or damaged.

SUMMARY OF THE INVENTION

It is therefore an object of the present invention to provide an electronic device using recording medium which can solve the above-mentioned problems.

According to the present invention, there is provided an electronic device using a recording medium which comprises a device body, a lid and a guide mechanism. The device body has an insertion mouth to insert a recording medium. The lid is moved between a position for closing the insertion mouth of the device body and a position for opening the insertion mouth of the device body. The guide mechanism guides the recording medium into the insertion mouth. The guide mechanism includes a first guide portion provided along the lower end of the insertion mouth of the front surface side and a second guide portion provided on the lid and which is located outside the first guide portion when the lid is moved to the opening position.

According to the present invention, there is provided an electronic device using a recording medium which comprises a device body and a lid. The device body includes an insertion mouth to insert the recording medium. A first guide portion for guiding the recording medium inserted into the insertion mouth is provided on the front surface side of the device body. The lid is moved between a first position for closing the insertion mouth and a second position for opening the insertion mouth. The lid includes a second guide portion for guiding the recording medium inserted into the insertion mouth together with the first guide portion when the lid is moved to the second position.

According to the present invention, there is provided an electronic device using a disk-like recording medium which comprises a device body and a lid. The device body includes an insertion mouth for inserting the disk-like recording medium. The insertion mouth is defined at the position over the device body when the device body is installed. The device body includes at its front surface side a first guide portion for guiding the recording medium inserted into the insertion mouth. The lid is moved between a first position for closing the insertion mouth of the device body and a second position for opening the insertion mouth and which is located at the outer portion of the first guide portion. The lid includes a second guide portion for guiding the recording medium inserted into the insertion mouth together with the first guide portion when the lid is moved to the second position.

BRIEF DESCRIPTION OF THE DRAWINGS

The present invention will be more readily understood with reference to the accompanying drawings, wherein:

FIGS. 1A and 1B show an example of a reproducing apparatus, in which

FIGS. 2A and 2B show a reproducing apparatus according to an embodiment of the present invention, in which

FIGS. 3A and 3B are cross-sectional views illustrating a main portion of the reproducing apparatus according to the embodiment of the present invention, in which

DESCRIPTION OF THE INVENTION

Figure 2A:
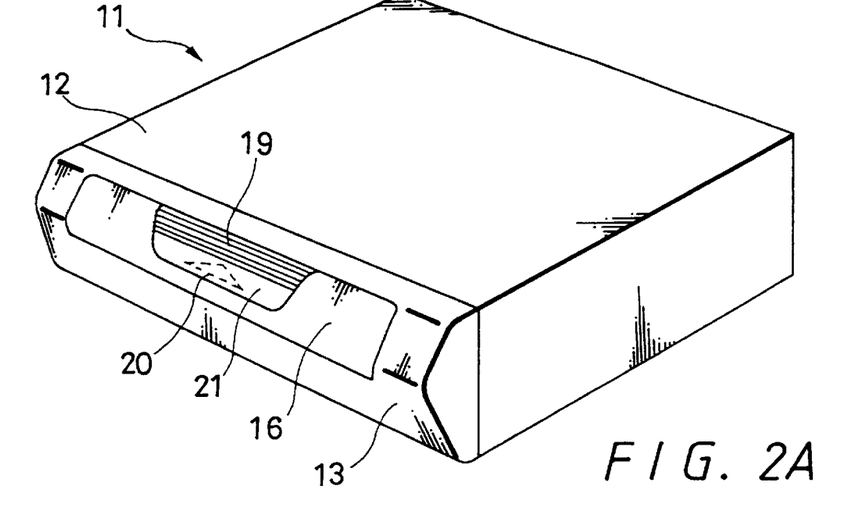
FIG. 2A is a perspective view illustrating the reproducing apparatus with a lid being opened.
Figure 2B:
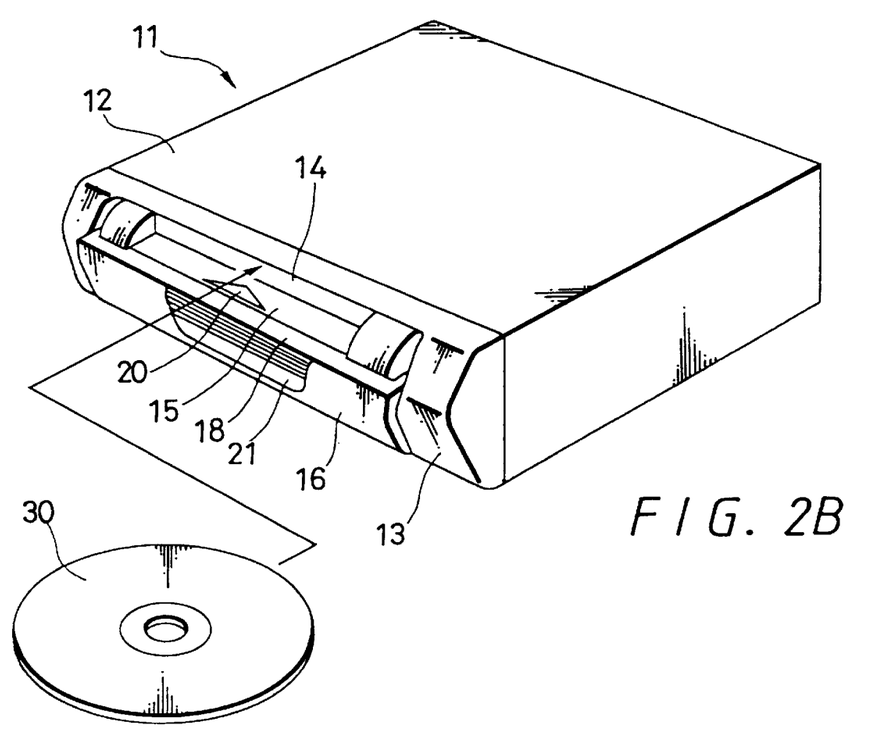
FIG. 2B is a perspective view illustrating the reproducing apparatus with the lid being closed.

An electronic device using a recording medium according to an embodiment of the present invention will hereinafter be described with reference to the drawings. In the following embodiment, a reproducing apparatus for use with a car navigation system using an optical disk such as a CD-ROM disk as disk-like recording medium will be described. FIGS. 2A and 2B show a reproducing apparatus 11 according to an embodiment of the present invention. The reproducing apparatus 11 has a device body 12 which incorporates therein a disk reproducing unit for reproducing an optical disk in which information is recorded inserted into an insertion mouth, which will be described later on, a mechanism portion for loading the optical disk inserted from the insertion mouth onto the disk reproducing unit and the like.

Figure 6:
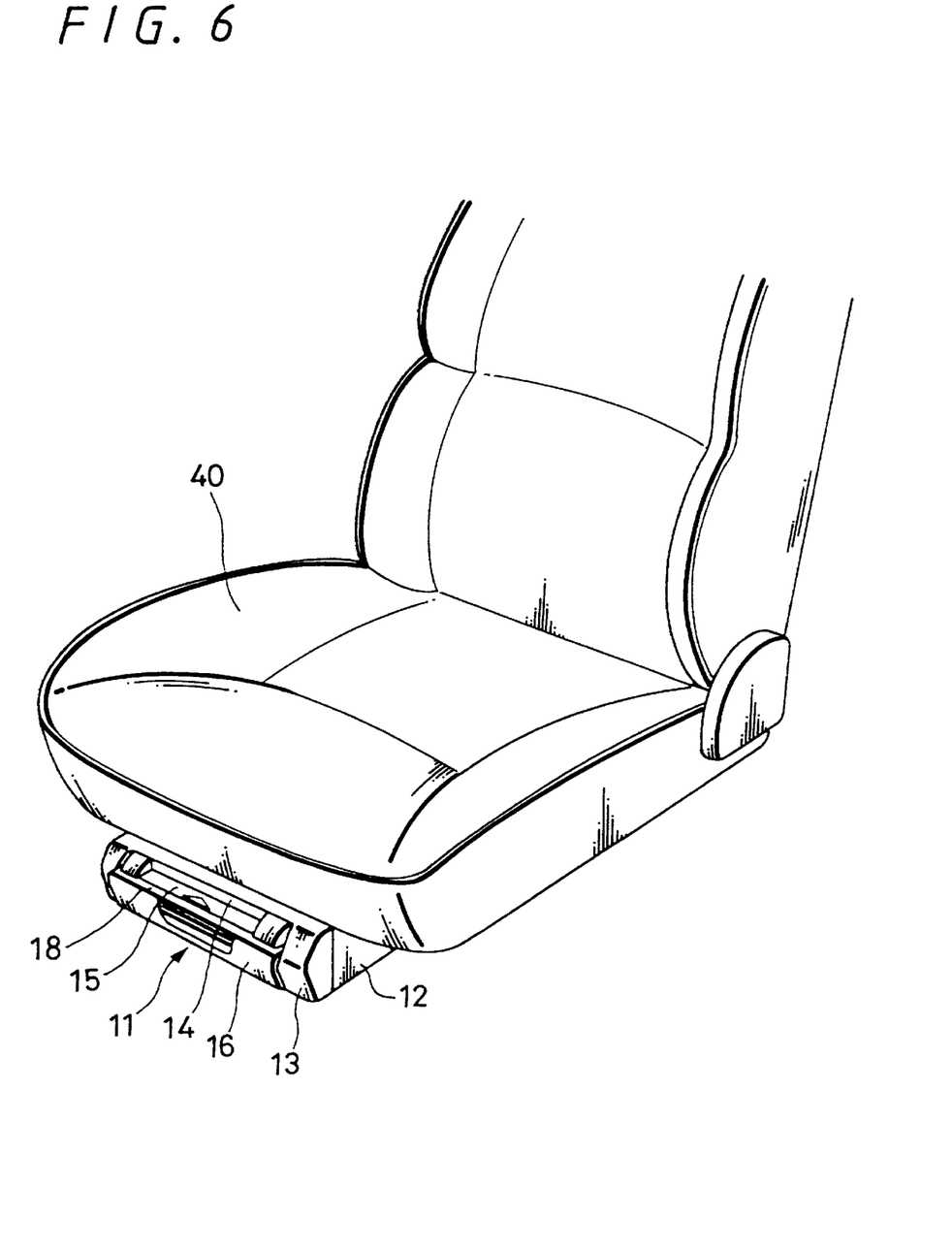
FIG. 6 is a perspective view illustrating the manner in which the reproducing apparatus according to the embodiment of the present invention is installed under the seat in the inside of the car.

As illustrated, an insertion mouth 14 is defined on the vertical surface of a front panel 13 attached to the front surface of the device body 12. An optical disk 30 is substantially horizontally inserted into the insertion mouth 14 and thereby loaded onto the device body 12. As shown in FIGS. 2B and 3B, the insertion mouth 14 is defined at the upper position of the device body 12, i.e., the upper position of the front panel 13. As a result, as shown in FIG. 6, when the reproducing apparatus 11 is installed under the seat in the inside of the car, the insertion mouth 14 is located near the seat, i.e., at the upper side of the reproducing apparatus 11.

The disk 30 inserted into the insertion mouth 14 is loaded onto the disk reproducing unit by the disk loading mechanism of the device body 12 and thereby reproduced.

Figure 5:
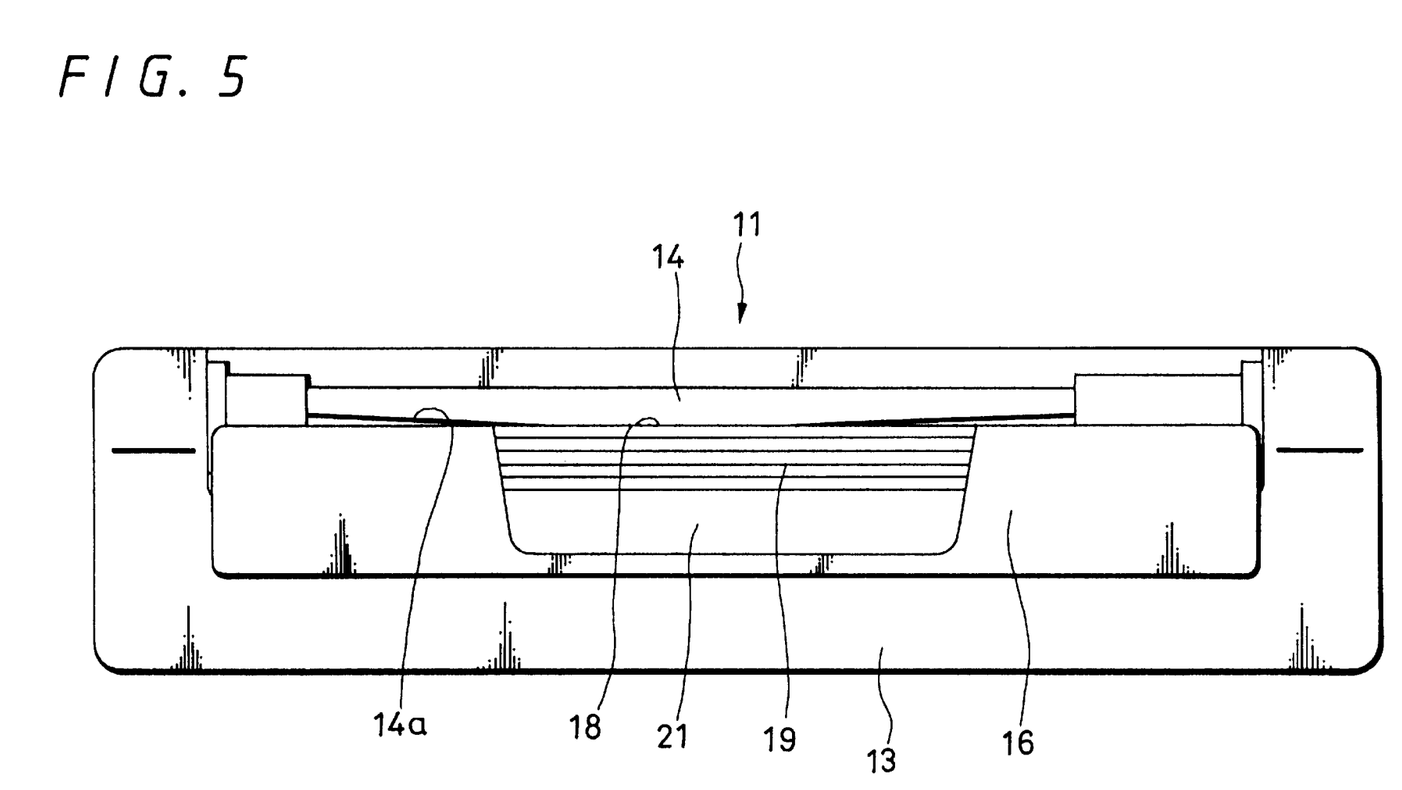
FIG. 5 is a front view of the reproducing apparatus according to the embodiment of the present invention with the lid being opened as seen from front.

As shown in FIG. 5, the insertion mouth 14 is formed such that the center of the end edge portion of the lower side, i.e., lower edge side portion 14a of the insertion mouth 14 is concaved downwardly. In other words, the lower edge side portion 14a is inclined from the center of the disk toward the outer peripheral side of the insertion mouth 14. Therefore, when the disk 30 is inserted, the lower edge side portion 14a of the insertion mouth 14 and the disk 30 are contacted at only the outer peripheral portion of the disk so that the recording surface of the disk 30 can be prevented from being damaged.

In the reproducing apparatus 11, a guide surface portion 15 for guiding the disk 30 into the insertion mouth 14 is provided in front of the insertion mouth 14 of the device body 12. The upper surface of the guide surface portion 15, i.e., surface opposing the surface of the disk 30 inserted into the insertion mouth 14 is formed as a flat surface. The guide surface portion 15 has the same width as that of the insertion mouth 14 and is extended forwardly from the lower edge side portion 14a of the insertion mouth 14 of the front panel 13 in substantially the horizontal direction to thereby form a single flat surface together with the lower edge side portion 14a. When the disk 30 is inserted into the device body 12 from the insertion mouth 14, the disk 30 is guided along the guide surface portion 15 so that the disk 30 can be inserted into the device body 12 reliably.

Figure 4:
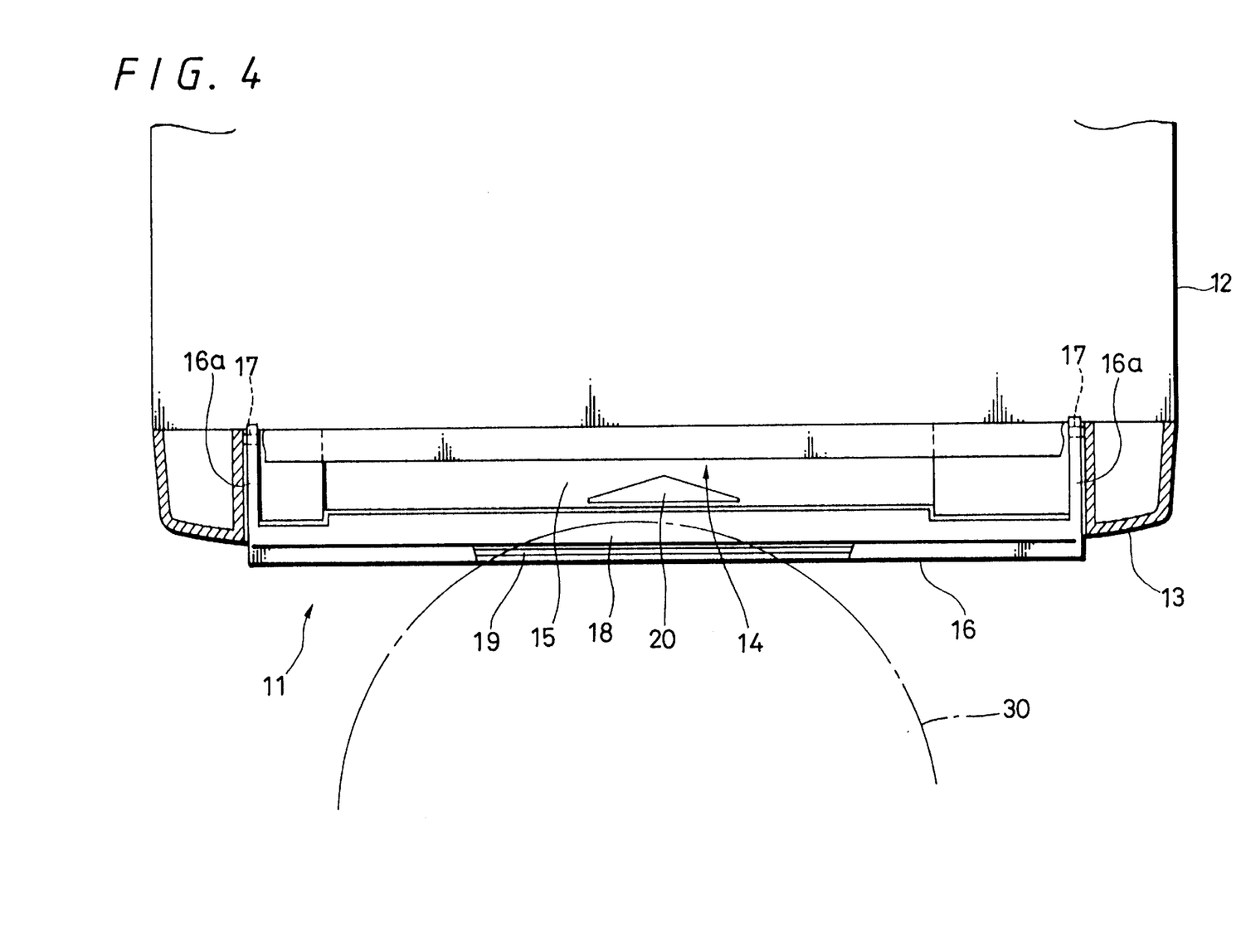
FIG. 4 is a plan view of the reproducing apparatus according to the embodiment of the present invention with the lid being opened as seen from above.

This guide surface portion 15 has a function that the user can visually confirm the position of the insertion mouth 14 even when the user looks down the reproducing apparatus 11. As shown in FIG. 4, this guide surface portion 15 has an area wide enough to enable the user to visually confirm the position of the guide surface portion 15 even when the user looks down the reproducing apparatus 11.

A lid 16 for preventing the disk 30 from being smudged by dusts or the like is rotatably attached to the front panel 13 of the reproducing apparatus 11. The lid 16 is moved on the outer surface side of the front panel 13 so as to open and close the insertion mouth 14 when it is rotated. Tops of right and left arm portions 16a, 16a extended from the right and left ends of the lid 16 are pivotally supported to shaft protrusions 17, 17 protruded in the deep portion of the front panel 13. The lid 16 is rotated about the shaft protrusions 17, 17 so that the lid 16 is moved in the upper and lower direction so as to cover the outer surface of the front panel 13 between position for closing the insertion mouth 14 and a position for opening the insertion mouth 14.

An upper end surface of the lid 16 is formed as a flat surface having a predetermined area over the whole width. As will be described later on, when the lid 16 is moved to the opening position, this upper end surface portion of the lid 16 becomes an auxiliary guide surface portion functioning as an extended portion of the guide surface portion 15.

A number of uneven rail-like hooks 19 are formed on the central portion of the front surface of the lid 16 in the horizontal direction as shown in FIG. 2A. When the user opens and closes the lid 16, the user can move the lid 16 in the closing position direction or the opening position direction with a finger on the hooks 19.

Although not shown, the reproducing apparatus 11 includes a lock mechanism for fixing and holding the lid 16 at the closing position. As the lock mechanism, there is a lock mechanism comprising a magnet, for example, attached to the front panel 13 side and a magnetic metal plate attached to the lid 16, wherein when the lid 16 is located at the closing position, the magnetic metal plate 16 is magnetically attracted by the magnet and thereby the lid 16 is locked.

Figure 3A:
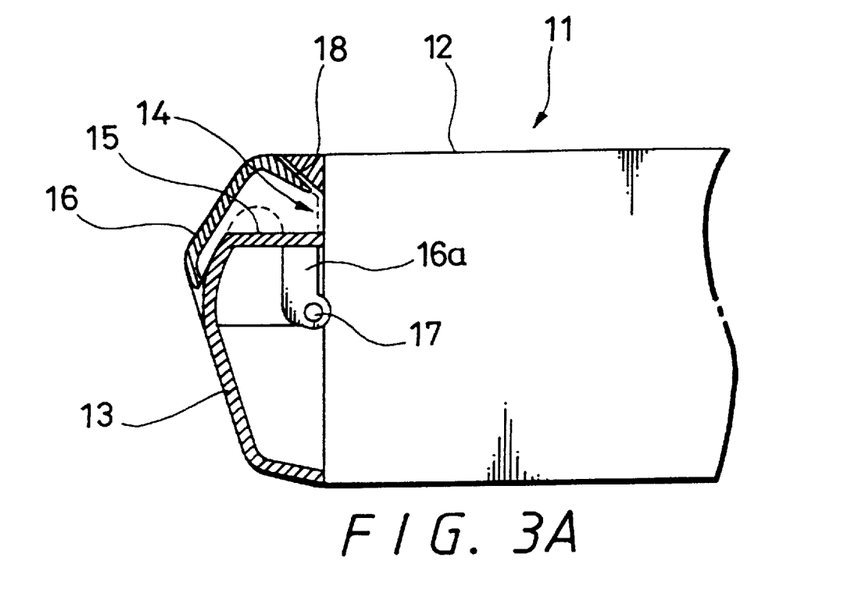
FIG. 3A is a cross-sectional view illustrating a manner in which a lid is opened.
Figure 3B:
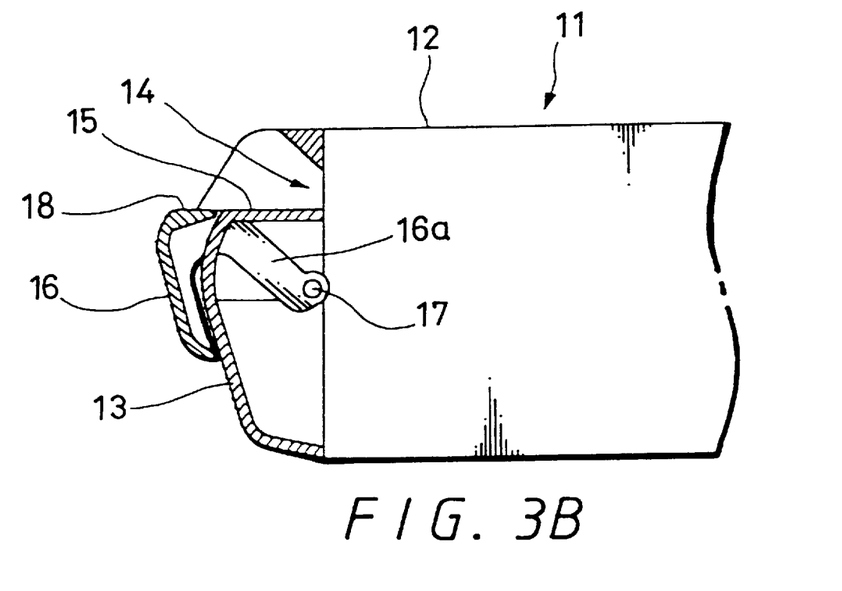
FIG. 3B is a cross-sectional view illustrating a manner in which the lid is closed.

Under the condition that the lid 16 is locked at the closing position, i.e., the insertion mouth 14 is closed by the lid 16 as shown in FIGS. 2A and 3A, dusts or the like can be prevented from entering the inside of the device body 12 from the insertion mouth 14, and the guide surface portion 15 also is covered by the lid 16.

Under this state, if the user lowers the lid 16 in the opening position direction with a finger on the hooks 19 as shown in FIGS. 2A and 3A, i.e., lowers the lid 16 down to the opening position, then the insertion mouth 14 is opened to insert the disk 30 and the guide surface portion 15 is exposed as shown in FIGS. 2B, 3B, 4 and 5. Under the condition that the lid 16 reaches the position for completely opening the insertion mouth 14, as shown in FIG. 3B, the auxiliary guide surface portion 18 is placed in front of the guide surface portion 15, becomes flush with the guide surface portion 15 and placed in substantially the horizontal state.

Under the condition shown in FIG. 3B, the auxiliary guide portion 18 of the lid 16 functions as an extended portion of the guide surface portion 15. Specifically, when the disk 30 is inserted, the disk 30 can be guided to the insertion mouth by the wide surface comprising the auxiliary guide surface portion 18 and the guide surface portion 15 of the lid 16.

As described above, when the lid 16 is moved to the opening position to open the insertion mouth 14, the guide surface portion 15 is outwardly extended and expanded much more by the auxiliary guide surface portion 18 of the lid 16. As a result, the user can visually and more easily recognize and confirm the disk insertion guide comprising the auxiliary guide surface portion 18 and the guide surface portion 15.

Further, in this reproducing apparatus 11, a triangular indicating portion 20 for indicating the direction in which the disk 30 is inserted into the device body 12 is provided at the central portion of the guide surface portion 15 of the front panel 13. This indicating portion 20 is energized by a light source such as an LED (light-emitting diode) provided in the inside of the front panel 13 so as to flash in green, for example. The indicating portion 20 serves also to indicate the on/off of the power supply of the reproducing apparatus 11. That is, when the reproducing apparatus 11 is turned on, the indicating portion 20 is energized, and when the reproducing apparatus 11 is turned off, the indicating portion 20 is deenergized.

As shown in FIG. 2A, a transparent or semitransparent window portion 21 is defined in the center of the front surface portion of the lid 16 at its position opposing the indicating portion 20. The user can visually confirm the indicating portion 20 from the outside through this window portion even under the condition that the lid 16 is placed at the position for closing the insertion mouth 14 as shown in FIG. 2A.

FIG. 6 shows a manner in which the reproducing apparatus 11 is in use.

As shown in FIG. 6, the reproducing apparatus 11 is installed under a seat 40 in the inside of the car.

As shown in FIG. 6, the user looks down the reproducing apparatus 11 under the condition that the user is seated. Therefore, it is difficult for the user to directly and visually confirm the insertion mouth 14. However, in the reproducing apparatus 11 according to the present invention, when the lid 16 is moved to the opening position to open the insertion mouth 14, the guide surface portion 15 is extended and expanded by the auxiliary guide surface portion 18 of the lid 16 so that the position of the guide surface portion 15 can be easily confirmed or recognized. Therefore, even when the user does not see the insertion mouth 14, the user can accurately recognize the position of the insertion mouth 14.

Accordingly, the user need not find the insertion mouth 14 by intuition or by groping, and the user can easily and reliably insert the disk 30 into the device body 12 from the insertion mouth 14.

In the reproducing apparatus 11, since the lid 16 is provided rotatably, the insertion mouth 14 can be opened and closed with a very small space. Accordingly, as shown in FIG. 6, when the reproducing apparatus 11 is installed under the seat in the inside of the car, if the lid 16 is moved to the opening position, then the lid 16 can be prevented from disturbing the user's legs. Further, the lid 16 can be prevented from touching the user's legs, and hence the lid 16 can be protected from being damaged.

In the reproducing apparatus 11, since the indicating portion 20 for indicating the direction in which the disk 30 is inserted into the device body 12 is provided on the guide surface portion 15 of the front panel 13, the user can easily grasp the position of the insertion mouth 14 in the dark place or at night. Thus, the user can reliably insert the disk 30 into the device body 12 from the insertion mouth 14.

Further, since the lid 16 includes the window portion 21 which enables the user to visually confirm the indicating portion 20 from the outside, the user can visually confirm the manner in which the indicating portion 20 is energized even under the condition that the insertion mouth 14 is closed by the lid 16.

While the reproducing apparatus according to the present invention has been described so far, the present invention is not limited to the above-mentioned embodiment.

By way of example, the recording medium for the electronic device using recording medium is not limited to the disk, and the present invention may use a tape cassette or the like.

The indicating portion 20 is not limited to an electrical means such as LED and the indicating portion 20 may be an indication based on the printing made by a luminous paint.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An electronic device using a recording medium comprising:

a device body having an insertion mouth for inserting the recording medium;

a lid moved between a position for closing the insertion mouth of the device body and a position for opening the insertion mouth; and guide means for guiding the recording medium to the insertion mouth, the guide means having a first guide surface provided along a lower end of the insertion mouth of a front surface side of the device body and a second guide surface provided on the lid and which is located outside the first guide surface when the lid is moved to the position for opening the insertion mouth, wherein the first guide surface is separable from the second guide surface.

2. An electronic device using a recording medium as claimed in claim 1, wherein the second guide surface forms a substantially single surface together with the first guide surface when the lid is moved to the position for opening the insertion mouth.

3. An electronic device using a recording medium as claimed in claim 1, wherein the lid is attached to the device body such that the lid is rotated between the closing position and the opening position.

4. An electronic device using a recording medium according to claim 1, further comprising indicating means for indicating a direction in which the recording medium is inserted into the insertion mouth.

5. An electronic device using a recording medium as claimed in claim 4, wherein the indicating means is a light-emitting indicating means having a light source.

6. An electronic device using a recording medium as claimed in claim 4, wherein the indicating means is provided on the guide means.

7. An electronic device using a recording medium as claimed in claim 6, wherein the indicating means is provided on the first guide surface at its portion opposing to the recording medium when the recording medium is inserted into the insertion mouth.

8. An electronic device using a recording medium as claimed in claim 4, wherein the lid includes a window portion for enabling a user to visually confirm the indicating means from an outside position when the lid is placed at the closing position.

9. An electronic device using a recording medium comprising:
- a device body having an insertion mouth for inserting the recording medium, the device body having extending from its front surface side provided a first guide surface for guiding the recording medium inserted into the insertion mouth; and
- a lid moved between a first position for closing the insertion mouth of the device body and a second position for opening the insertion mouth and which is located outside the first guide surface, the lid including a second guide surface for guiding the recording medium inserted into the insertion mouth together with the first guide surface when the lid is moved to the second position.

10. An electronic device using a recording medium as claimed in claim 9, wherein the second guide surface forms a substantially single surface to a lower end portion of the insertion mouth together with the first guide surface when the lid is moved to the position for opening the insertion mouth.

11. An electronic device using a recording medium as claimed in claim 9, wherein the lid is attached to the device body such that the lid is rotated between the closing position and the opening position.

12. An electronic device using a recording medium according to claim 9, further comprising indicating means for indicating a direction in which the recording medium is inserted into the insertion mouth.

13. An electronic device using a recording medium as claimed in claim 12, wherein the indicating means is a light-emitting indicating means having a light source.

14. An electronic device using a recording medium as claimed in claim 12, wherein the indicating means is provided on the guide means.

15. An electronic device using a recording medium as claimed in claim 14, wherein the indicating means is provided on the first guide surface at its portion opposing to the recording medium when the recording medium is inserted into the insertion mouth.

16. An electronic device using a recording medium as claimed in claim 12, wherein the lid includes a window portion for enabling a user to visually confirm the indicating means from an outside position when the lid is placed at the closing position.

17. An electronic device using a disk-like recording medium comprising:
- a device body having an insertion mouth for inserting the disk-like recording medium, the insertion mouth being defined at the position above the device body when the device body is installed, and the device body having on its front surface side provided a first guide surface extending from the insertion mouth for guiding the recording medium inserted into the insertion mouth; and
- a lid moved between a first position for closing the insertion mouth of the device body and a second position for opening the insertion mouth and which is located at an outer portion of the first guide surface, the lid having a second guide surface for guiding the recording medium inserted into the insertion mouth together with the first guide surface when the lid is moved to the second position, wherein the first guide surface is separate from the second guide surface when the lid is moved to the closed position.

18. An electronic device using a disk-like recording medium as claimed in claim 17, wherein the second guide surface forms a substantially single surface to a lower end portion of the insertion mouth together with the first guide surface when the lid is moved to the position for opening the insertion mouth.

19. An electronic device using a disk-like recording medium as claimed in claim 18, wherein the insertion mouth has a lower end portion concaved from an outer periphery of the disk-like recording medium inserted into the insertion mouth to a center of the disk-like recording medium.

20. An electronic device using a disk-like recording medium as claimed in claim 17, wherein the lid is attached to the device body such that the lid is rotated between the closing position and the opening position.

21. An electronic device using a disk-like recording medium according to claim 17, further comprising indicating means for indicating a direction in which the recording medium is inserted into the insertion mouth.

22. An electronic device using a disk-like recording medium as claimed in claim 21, wherein the indicating means is a light-emitting indicating means having a light source.

23. An electronic device using a disk-like recording medium as claimed in claim 21, wherein the indicating means is provided on the guide means.

24. An electronic device using a disk-like recording medium as claimed in claim 23, wherein the indicating means is provided on the first guide surface at its portion opposing to the recording medium when the recording medium is inserted into the insertion mouth.

25. An electronic device using a disk-like recording medium as claimed in claim 21, wherein the lid includes a window portion for enabling a user to visually confirm the indicating means from an outside position when the lid is placed at the closing position.

26. An electronic device using a disk-like recording medium comprising:
- a device body having an insertion mouth for inserting the disk-like recording medium, the insertion mouth being defined at the position above the device body when the device body is installed, and the device body having a first guide surface extending from the insertion mouth for guiding the recording medium inserted into the insertion mouth; and
- a lid moved between a first position for closing the insertion mouth of the device body and a second position for opening the insertion mouth and which is located at an outer portion of the first guide surface, the lid having a second guide surface for guiding the recording medium inserted into the insertion mouth together with the first guide surface when the lid is moved to the second position, wherein the first guide surface is separate from the second guide surface when the lid is moved to the closed position, and forms a substantially single surface to a lower end portion of the insertion mouth together with the second guide surface when the lid is moved to the position for opening the insertion mouth.

* * * * *